UNITED STATES PATENT OFFICE.

GEORGE DON BEYMER, OF PORTLAND, OREGON, ASSIGNOR TO GUS F. HUPNER, OF OMAHA, NEBRASKA.

CLEANING AND POLISHING LIQUID FOR VARNISHED SURFACES AND PROCESS OF MAKING SAME.

1,218,163.        Specification of Letters Patent.      Patented Mar. 6, 1917.

No Drawing.     Application filed December 30, 1914. Serial No. 879,702.

*To all whom it may concern:*

Be it known that I, GEORGE DON BEYMER, a citizen of the United States, residing at Portland, in the county of Multnomah and State of Oregon, have invented certain new and useful Improvements in Cleaning and Polishing Liquids for Varnished Surfaces and Processes of Making Same; and I do hereby declare the following to be a full, clear, and exact description of the invention, such as will enable others skilled in the art to which it appertains to make and use the same.

The object of this invention is to provide a means for filling the pores of varnished or enameled surfaces, and to renew the same; and I attain this object by the combining of the materials herein described, and possessing when combined as described the capacity for accomplishing the results mentioned.

Another object of my invention is to supply to dead and dry varnished, enameled or other surfaces, a high luster, and to make the surface hard, dry and practically non-porous and water-proof, and also proof against atmospheric action.

Another object of my invention is to make provision whereby an intimate bond is formed between the substance of which my coating is produced and the varnish or enamel upon which I produce the polished coating.

In order that the purposes of this invention may be accomplished, it is necessary that the Venice turpentine and the gum-arabic used shall be brought to a practically fluid condition; that is to say they must be brought into a condition in which they may be spread over the surface to be treated in a very thin coating.

I will now first describe the method of producing said liquid paste; then the method of producing the vehicle therefor, then the method of producing the cleaning and polishing composition, and then the method of producing the coating and polished surface.

*Method of producing the liquid paste.*

Take two ounces, avoirdupois, of gum camphor and pulverize the same in a mortar with a pestle without the addition of any alcohol or other solvent. Then liquefy said pulverized gum-camphor with two fluid ounces of oil-of-sweet-almonds. To do this the two substances may be placed in a suitable vessel over a slow fire until the gum-camphor is dissolved, after which the same may be set aside to cool. Too rapid or too long heating would tend to drive off the gum-camphor and should be avoided. For convenience this liquid is termed No. 1.

Next pulverize with a pestle in a mortar, two ounces, avoirdupois, of gum arabic; then add to the pulverized gum about two fluid ounces or more of water and rub up the same until the gum is in a fluid condition; and for convenience this mixture is termed liquid No. 2.

To the liquid No. 2 thus produced add three ounces, avoirdupois, of Venice turpentine, mixing the same thoroughly in the mortar. When this mixing has been thoroughly accomplished, the gum-acacia and Venice turpentine will be in a condition to receive and mix with the ingredients subsequently to be added thereto. Thereupon add to said liquid No. 2 one fluid ounce of oil-of-sassafras, pouring the same slowly into the liquid and constantly stirring the mass; the oil thus added will cause an emulsion and must be added slowly.

To this emulsion add slowly three fluid ounces of olive oil constantly stirring the mass. Then add the cooled composition (liquid No. 1) of gum-camphor and oil-of-sweet-almonds. The substance used in the above described method, except while dissolving the gum-camphor, are at the ordinary normal temperatures above 32 degrees Fahrenheit. After the mixture of gum-camphor and oil-of-sweet-almonds has been added to the emulsion, the product is still in the form of an emulsion. To this emulsion add slowly, while constantly stirring the mass, two and one-half fluid ounces of hydrochloric acid, and then add from two and one-half to four ounces of sulfuric acid, constantly stirring the mass all the time. The addition of the sulfuric acid will cause an emission of fumes and will bring the composition to a boiling heat and finally turn it black. Provision should be made to carry off the fumes as they are disagreeable and detrimental to health. The stirring may now be suspended and observation made to see whether any oily substance appears; if so add a little more sulfuric acid, and so continue until no further oily appearance occurs. Then let the composition cool.

The composition thus produced is what I term the liquid-paste and will improve with age. It can be put up in bottles or other forms of packages and sold to the trade, to be mixed with a suitable vehicle in appropriate proportions as occasion demands; or it may be mixed with the vehicle and the resulting composition thus formed sold to the trade.

By forming the paste from the materials specified, as set forth, a paste is obtained which embodies acid sufficient to cut the grease and soften the varnish, and Venice turpentine and gum-arabic sufficient to close and cover the minute pores of the varnished surface so cleaned and softened.

The vegetable oils serve as a permanent vehicle for the constituents. They are neutralized by the acids so that they will not form an oily surface. The turpentine and gum are in a minutely-divided condition and are capable of being mixed with a further vehicle, and thereupon spread so finely over a surface as to be devoid of all stickiness.

Method of making the vehicle.

To one-half gallon of pure cider vinegar, add three-eighths of a gallon of coal-oil and one-eighth of a gallon of spirits of turpentine. The amount of vehicle thus made is approximately sufficient for the amount of paste made by the above-mentioned process.

Method of making the cleaning and polishing composition.

I find the best results are secured by adding the paste to the vehicle in the proportion of about 1 to 10, at ordinary temperatures above 32 degrees Fahrenheit. When the paste and vehicle have been thus put together, add rotten stone in the proportion approximately of one ounce, avoirdupois, of rotten stone to a gallon of the composition. The composition may be thoroughly mixed by shaking the same in a bottle.

When the composition thus produced is allowed to stand for a considerable time, separation by gravity will occur, and the composition must be well shaken before using. The judgment of the maker must be used to some extent to determine the proportions of paste and vehicle requisite to obtain the best results; for if the proportion of paste is too great, the application of the composition to a varnished surface will cause the varnish to soften too much; while if the proportion of paste is too little, the composition will not be sufficiently effective to cut or clean a rough surface.

The purpose of the gum-camphor is to assist in producing the required combination of the various elements and to harden and dry the paste and assist in giving luster to the surface. The purpose of the spirits of turpentine is to cause a desirable drying of the vehicle to occur when the composition is to be used in cleaning surfaces having corners where the operator cannot thoroughly rub the same.

The purpose of the coal-oil and vinegar is to assist in cutting off the dirt, grease, dead varnish, or any foreign substance, and to assist in rubbing down and smoothing the surface of the varnish, and also to afford a non-drying vehicle for the paste, so that the same may be thoroughly rubbed into the pores.

In cases where objects to be cleaned are heavily coated with dirt, smoke or other matter accumulated by exposure, as for instance, railroad cars and the like, I deem it desirable to reduce the amount of spirits of turpentine to one-half or one-third of the amount above specified, and to correspondingly increase the amount of coal-oil so as to afford a cleaning composition that will dry more slowly than that in which the above specified amounts of spirits of turpentine and coal-oil are used.

Method of operating with my composition to produce a hard dry smooth surface of polished coating.

In practical use, the operator will shake the cleaning composition well, and will then saturate a piece of waste or other suitable material with such composition and will dip the same into some rotten stone to cause rotten stone to adhere thereto, and will then rub the surface to be cleaned with the saturated waste. The effect is to cut the dirt and accumulations from the surface to be cleaned, and to leave said surface ready to be polished. The rotten stone assists in reducing the scratches, cracks, mars, and packing marks, if any, on the surface, and assists in smoothing the surface of the varnish to be coated, and at the same time, the body composed of the Venice turpentine, gum-arabic and gum-camphor, is spread evenly over the surface; and when the surface has been cleaned, the workman will take a dry or comparatively dry piece of waste and rub the coated surface. Then the workman will take another dry piece of waste and will rub the surface lightly at first in order not to mar the softened surface of the cleaned varnish until the air has had time to cause the coating to dry and harden. All such drying and hardening will be effected within three minutes, more or less, after the vehicle has been removed by the waste.

The preliminary light rubbing with the waste assists in the drying and the hardening process, and as the drying and hardening process proceeds, the workman may rub harder and with more pressure, thus bringing the surface to a high polish and luster.

The cleaning composition made after the manner above described dries slowly, so long as the vehicle is present, thus enabling the workman to rub the surface as long as he likes, with but very little loss by evaporation from the saturated waste and from the surface coated with the cleaning composition. And it is only after the vehicle has been removed by the drier waste that the drying effects begin to be noticeable on the coated surface. By reason of this it is possible for the workman to rub while moist any especially marred portions of the surface for such a time as may be necessary to smooth the surface and remove the mars; then when it is desired to produce a glossy, glass-like polished surface, the vehicle will be wiped off and the polishing effected in the manner stated.

The use of the cleaning and polishing composition for removing rust and restoring polished metal surfaces, is substantially the same as that just described. The use on mirrors and glass surfaces is also substantially the same as that above detailed.

By numerous applications to a raw, wooden surface, the composition may be made to produce a hard polished surface of great durability without the use of varnish. After each application the surface should be rubbed hard and dry. For such use the coal-oil should be omitted from the vehicle, and the proportions of the paste and vehicle should be about 1 to 4.

This composition is applicable for finishing the wood work of musical instruments as violins, mandolins, guitars, pianos, organs, etc.

In making this invention and discovery I have employed a combination of vegetable and mineral oils, the one to form an enduring vehicle for the paste and the other a transient vehicle for spreading the coating material over the surface. The purpose of using the vegetable oils in the paste is to provide for the Venice turpentine and gum-arabic, a vehicle that will not be affected by the vehicle which is used to spread the paste. In making the paste, the gum-camphor might be dissolved by heating the same in the olive oil instead of in the oil-of-sweet-almonds, but I find it advisable to dissolve the gum-camphor in the oil of sweet-almonds instead of in the olive oil or oil of sassafras; the olive oil being too heavy and the oil of sassafras too light for the most satisfactory results.

Careful tests show that the best results are obtained when the invention is put into practice with the materials and in the manner herein detailed, but the practical workman may vary the same to a considerable degree without departing from the spirit of the invention and discovery.

What I claim is:

1. A cleaning and polishing composition comprising the reaction products of Venice turpentine, gum-arabic, gum-camphor, a vegetable oil, a mineral oil, hydrochloric acid and sulfuric acid in proportions substantially as set forth.

2. A cleaning and polishing composition comprising the reaction products of Venice turpentine, gum-arabic, gum-camphor, oil of sassafras, olive oil, hydrochloric acid, sulfuric acid, oil of sweet-almonds, cider vinegar, and coal oil in proportions substantially as set forth.

3. A cleaning and polishing composition comprising the reaction products of Venice turpentine, gum-arabic, gum-camphor, oil of sassafras, olive oil, hydrochloric acid, sulfuric acid, oil of sweet-almonds, cider vinegar, coal oil and spirits of turpentine, in proportions substantially as set forth.

4. A cleaning and polishing composition comprising the reaction products of Venice turpentine, gum-arabic, gum-camphor, oil of sassafras, olive oil, hydrochloric acid, sulfuric acid, oil of sweet-almonds, cider vinegar, coal oil, spirits of turpentine, and rotten stone in proportions substantially as set forth.

5. A liquid paste comprising the reaction products of Venice turpentine, gum-arabic, gum-camphor, vegetable oils, hydrochloric acid, and sulfuric acid in proportions substantially as specified.

6. A liquid paste comprising the reaction products of Venice turpentine, gum-arabic, gum-camphor, oil of sassafras, olive oil, oil of sweet almonds, hydrochloric acid and sulfuric acid in proportions substantially as specified.

7. The method of producing a liquid paste comprising mixing together a solution of gum-camphor and oil of sweet almonds and an aqueous solution of gum-arabic, then mixing therewith Venice turpentine and adding thereto oil of sassafras and stirring the same to produce an emulsion, then mixing olive oil with gum-camphor and oil of sweet almonds, adding the mixture of olive oil, gum-camphor and oil of sweet almonds to the said emulsion, and then adding to the final product thus formed hydrochloric acid and sulfuric acid, substantially as set forth.

8. A cleaning composition containing the reaction products of gum-arabic, Venice turpentine, gum-camphor, a vegetable oil, an inorganic acid, rotten stone, vinegar, and a mineral oil substantially in the proportions set forth.

9. A cleaning composition containing the reaction products of gum-arabic, Venice turpentine, gum-camphor, a vegetable oil, an inorganic acid, rotten stone, vinegar, spirits of turpentine, and a mineral oil substantially in the proportions set forth.

10. A cleaning composition containing the reaction products of gum-arabic, Venice turpentine, gum-camphor, a vegetable oil, rotten stone, an inorganic acid, vinegar, spirits of turpentine, and coal oil substantially in the proportions set forth.

In testimony whereof I affix my signature in presence of two witnesses.

GEORGE DON BEYMER.

Witnesses:
CHAS. L. DUDLEY,
RUTH SEAY.